US006357219B1

(12) United States Patent
Dudd, Jr. et al.

(10) Patent No.: US 6,357,219 B1
(45) Date of Patent: Mar. 19, 2002

(54) TURBINE ENGINE FUEL CONTROL SYSTEM

(75) Inventors: John E. Dudd, Jr., Three Rivers, MI (US); Dennis G. Demers, Mishawaka, IN (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/398,133

(22) Filed: Sep. 17, 1999

Related U.S. Application Data
(60) Provisional application No. 60/111,858, filed on Dec. 11, 1998.

(51) Int. Cl.[7] .............................. F02C 7/26; F02C 9/28
(52) U.S. Cl. ................................. 60/39.141; 60/39.281
(58) Field of Search .......................... 60/39.141, 39.281

(56) References Cited

U.S. PATENT DOCUMENTS

| | | | |
|---|---|---|---|
| 2,610,466 A | * 9/1952 | Ballantyne et al. | ....... 60/39.141 |
| 2,847,824 A | 8/1958 | Best et al. | .................. 60/39.14 |
| 4,118,926 A | * 10/1978 | Curvino et al. | .......... 60/39.141 |
| 4,350,008 A | 9/1982 | Zickwolf | .................... 60/39.14 |
| 4,464,895 A | 8/1984 | Morrison et al. | ........ 60/39.141 |
| 4,910,956 A | 3/1990 | Legore et al. | ............. 60/39.03 |
| 5,165,223 A | 11/1992 | Ingham et al. | ............. 60/39.06 |
| 5,212,943 A | 5/1993 | Harris | ...................... 60/39.141 |

FOREIGN PATENT DOCUMENTS

FR       2 704 905 A      10/1994

OTHER PUBLICATIONS

Attachment A—Presentation made Jan. 29, 1997 to Petroleum Helicopters Inc. (PHI) Entitled: "DP Fuel Trim Control System".
Attachment B—Presentation made Mar. 25, 1997 follow–up meeting with PHI Entitled: "Engine Start Control System".
Attachment C—Presentation made Jun. 19, 1997 follow–up meeting with PHI Entitled: "DP Upgrade".
Attachment D—Presentation made Jul. 30, 1997 to Army Entitled: "AMCOM/AlliedSignal Allison 250 Fuel Control Upgrade Meeting".

(List continued on next page.)

*Primary Examiner*—Louis J. Casaregola
(74) *Attorney, Agent, or Firm*—Larry J. Palguta

(57) ABSTRACT

A turbine engine fuel delivery system (10) and method has, in addition to the conventional fuel bypass (20) for diverting fuel exiting a fuel control (17) away from the engine (49) and back to a fuel pump (15) to maintain a relatively constant pressure differential across the fuel control (17), a separate controllable flow fuel bypass (21) for selectively diverting fuel exiting the fuel control (17) away from the engine (49) and back to the fuel pump (15) to decrease the rate of fuel flow to the engine (49) and correct an overtemperature condition, and an arrangement for enabling the controllable fuel flow bypass (21) during engine (49) start-up and disabling the controllable fuel flow bypass (21) when the engine (49) reaches normal idle speed. Once an engine (49) start or light off is detected, the system (10) automatically prevents turbine outlet temperature exceedences by reducing metered fuel flow to the engine nozzle. The controllable fuel bypass (21) includes a solenoid operable valve (29). A controller (45) is responsive to sensed exhaust gas temperature and supplies a pulse width modulated control signal to the solenoid operable valve (29) which cyclically enables and disables the return flow of a portion of the fuel flow to the engine (49) from the main fuel control (17) back to the engine fuel pump (15). The period of cyclic enabling and disabling is fixed and the fraction of each cycle during which enabling occurs is controlled in accordance with the monitored exhaust gas temperature. The fuel bypass (21) includes a particulate matter filter (25, 31), a flow limiting orifice (27), and the solenoid actuatable valve (29), and a check valve (23) connected in series between the fuel control (17) and the fuel pump (15).

12 Claims, 5 Drawing Sheets

OTHER PUBLICATIONS

Attachment E—Presentation made Sep. 5, 1997 to Allison Aircraft Engines Entitled: "Allison AE 250 Fuel Control Upgrade Partnership Presentation".

Attachment F—Presentation made May. 15, 1998 to Allison Aircraft Engines Entitled: "Allison AE 250 Fuel Control Upgrade Presentation".

Attachment G—Presentation made Jun. 23, 1998 to Navy Entitled: "Allison AE 250 Fuel Control Upgrade Presentation".

Attachment H—Mar. 30, 1999 Engineering Test Report—Engine Testing at Petroleum Helicopters.

* cited by examiner

TURBINE ENGINE FUEL CONTROL SYSTEM

Priority is claimed upon U.S. provisional patent application No. 60/111,858 filed Dec. 11, 1998.

The present invention relates generally to fuel delivery systems for engines, especially gas turbine engines, and more particularly to such fuel delivery systems for aircraft such as helicopters and small fixed-wing turboprops incorporating engine temperature limiting features during engine start. The system reduces the pilot workload by automatically controlling the engine temperature during engine starts.

BACKGROUND OF THE INVENTION

Many present control systems for turbine engines do not provide temperature limiting during engine start. Subsequently, under certain ambient conditions, battery conditions, manual control adjustments etc., the engine can overheat ("overtemp") thus causing delay or cancellation of the flight or unscheduled engine maintenance. In addition, the pilot has full responsibility to cut off the fuel when a potential hot start may occur. For example, a low battery condition when attempting to start a gas turbine engine results in a slower than normal engine cranking speed; however, fuel is supplied at the normal rate resulting in an over-rich fuel/air mixture and increased engine heating during the start-up process. If a hot start occurs, the engine shut off and restart attempted, the battery may be in an even more depleted condition aggravating the problem.

An audible alarm indicative of over-stress limits including temperature, output torque and engine speed, instructing the pilot to provide the corrective action is shown in U.S. Pat. No. 4,619,110. Water and/or additional fuel may also be automatically injected or the engine fuel flow automatically reduced.

A proposed solution to automatically avoiding hot start problems is provided in U.S. Pat. No. 3,902,315 where fuel flow during engine start is initially controlled by an intentionally over-rich scheduled function of engine speed only. The fuel flow control is switched to an acceleration and speed control schedule upon sensing, inter alia, an excessive tailpipe temperature which temperature is a function of both compressor inlet pressure and engine speed.

Another U.S. Patent considering the hot start possibility is U.S. Pat. No. 4,350,008 where the fuel flow rate is reduced upon sensing an excessive turbine temperature and that reduced flow continued until the over-temperature condition is corrected.

U.S. Pat. No. 5,101,619 teaches a hot start correcting system where fuel flow to the engine is completely shut-off for a specific brief period of time when an overtemperature condition is sensed. Fuel flow is then resumed for a longer specific time period regardless of the sensed temperature.

All four of these patented schemes utilize one fuel control valve for all fuel flow control.

The hot start problem has also been addressed in U.S. Pat. No. 3,964,253 where an additional parallel fuel flow path provides enhanced fuel richness during start with that additional flow being shut-off in the event an excessive temperature is sensed.

None of these patented schemes continues to monitor temperature and tailor the reduced fuel flow to the monitored temperature.

SUMMARY OF THE INVENTION

It is desirable to provide automatic temperature limiting during engine start and to provide such temperature limiting in a continuous, economical, relatively simple and retrofitable way. An externally mounted fuel solenoid valve provides an inexpensive solution eliminating the need for additional calibration or recalibration of the main fuel control. Only external plumbing is required for field installation.

The present invention provides solutions to the above problems by providing a fuel burning engine overtemperature avoidance system which monitors an engine temperature indicative temperature such as exhaust gas temperature, and diminishes fuel flow to the engine, for example, by diverting a portion of the fuel flow to the engine from the main fuel control back to the engine fuel pump, when the monitored temperature exceeds a threshold. A pulse width modulated control signal to a solenoid operable valve cyclically enables and disables the return flow of a portion of the fuel flow to the engine from the main fuel control back to the engine fuel pump. The period of cyclic enabling and disabling is fixed and the fraction of each cycle during which enabling occurs is controlled in accordance with the monitored exhaust gas temperature. Undiminished fuel flow is resumed when the monitored temperature falls below the threshold temperature. An engine operating parameter such as gas generator speed, is also monitored and fuel flow diminution to the engine is prevented despite the monitored temperature exceeding the threshold temperature when the monitored parameter exceeds a predetermined level such as engine idle speed. The threshold temperature may be determined by measuring ambient temperature and computing the threshold as a prescribed increment above the measured ambient temperature. Recording monitored temperature, gas generator speed and fuel flow diminution, allows subsequent modification of the engine fuel system to provide enhanced engine performance achieving overtemperature avoidance with reduced fuel flow diminution.

BRIEF DESCRIPTION OF THE DRAWING

Corresponding reference characters indicate corresponding parts throughout the several views of the drawing.

DESCRIPTION OF THE PREFERRED EMBODIMENT

Figure 2:
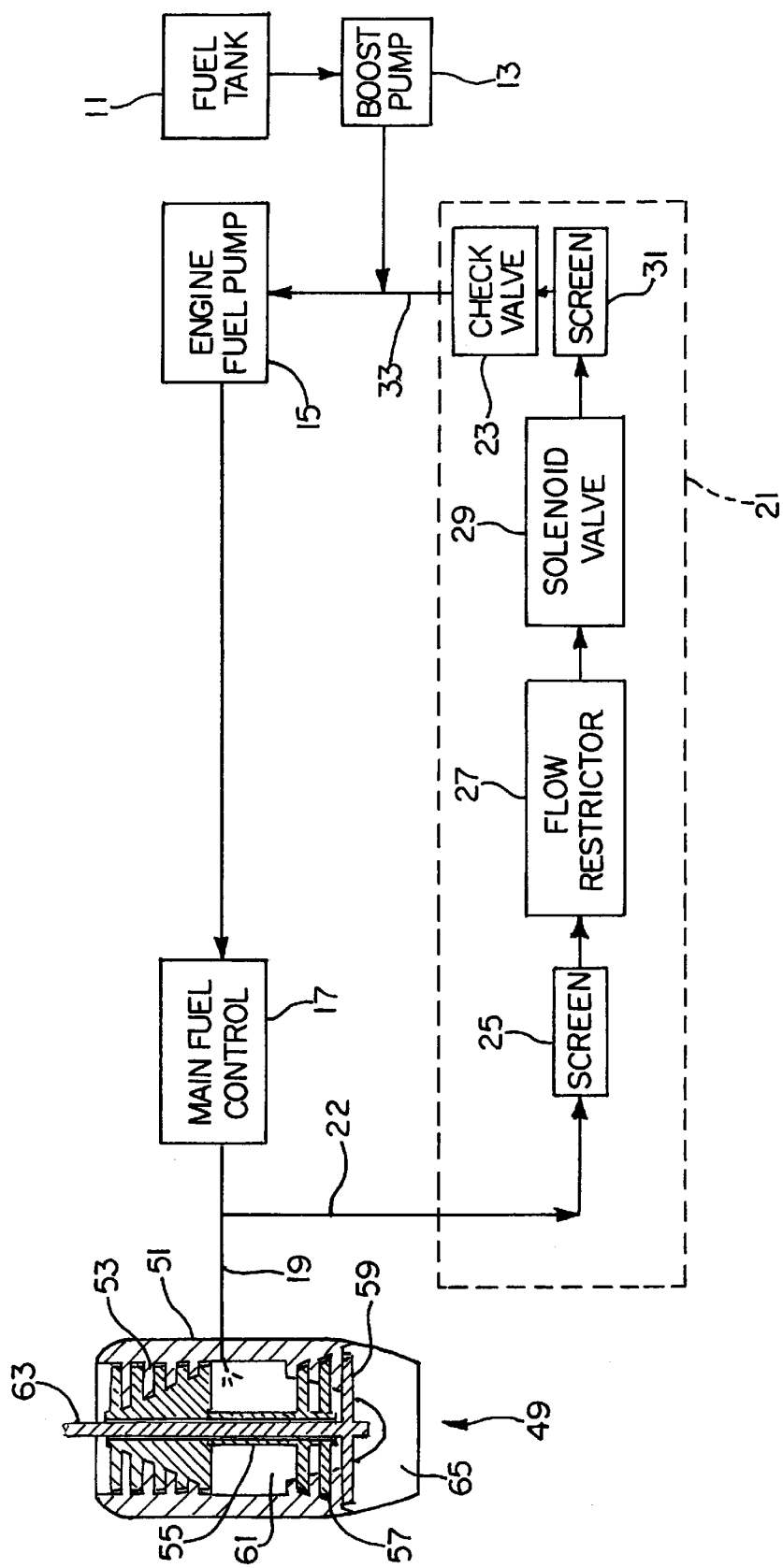
FIG. 2 is a more detailed schematic illustration of the fuel flow portion of the system of FIG. 1.

In FIG. 2, a simplified helicopter or fixed-wing aircraft free power turbine engine 49 is illustrated. The engine has a power output shaft 63 which is conventionally coupled to the helicopter rotor or aircraft propeller (not shown). Shaft 63 is driven by a power turbine 59. Air enters the engine housing 51 by way of compressor 53 and forms a combustible fuel/air mixture in combustor 61. The exiting combustion gasses power the compressor turbine 57 which drives shaft 55 and the compressor 53 and also drive the power turbine 59. Exhaust gasses exit by way of chamber 65 and the temperature (T4.5) of the exiting gasses is monitored by a set of temperature probes within chamber 65.

Figure 1:
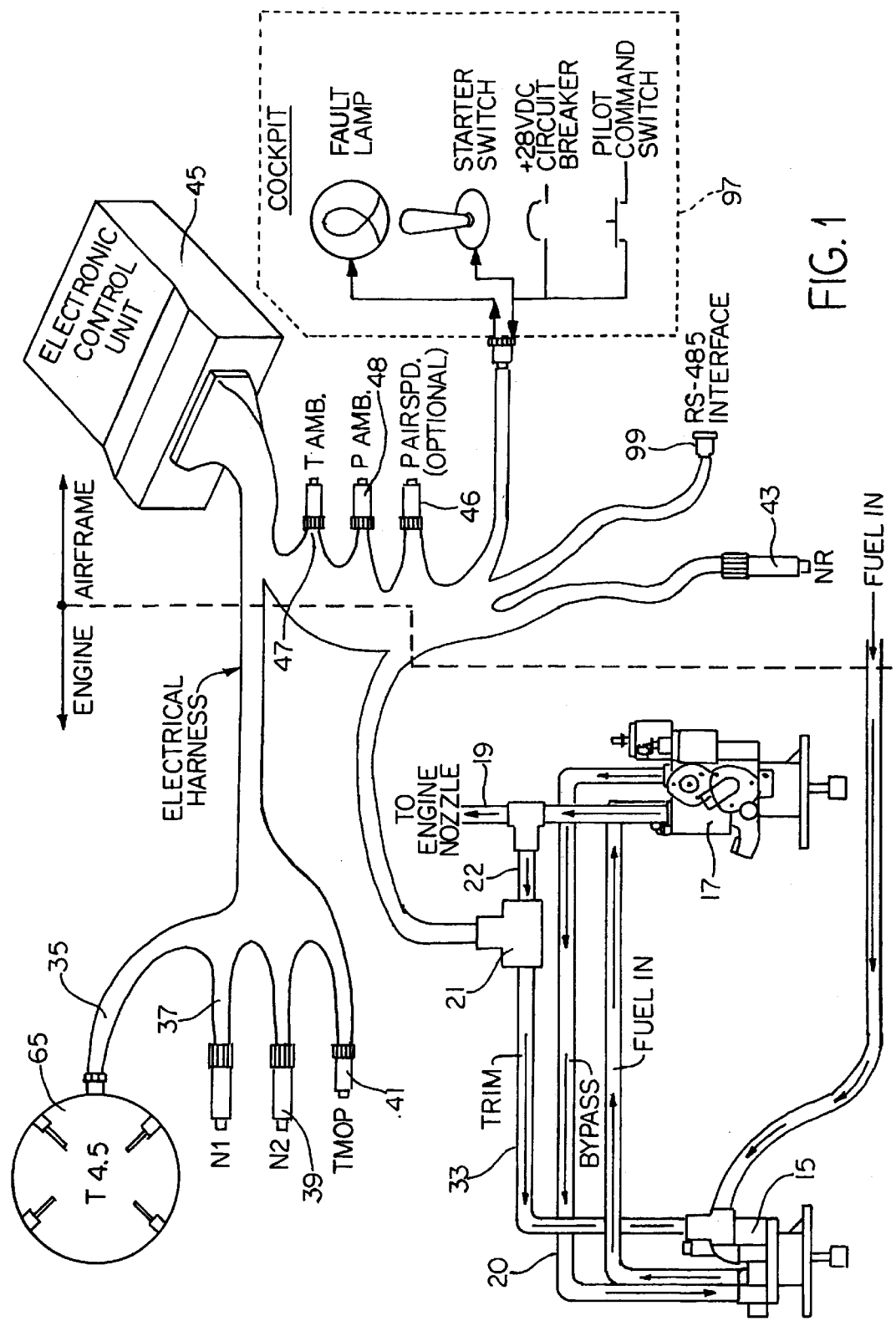
FIG. 1 is a schematic illustration of an engine control system according to the present invention.

Referring now to FIGS. 1 and 2, in fuel system 10 fuel is supplied from a tank 11 and a remotely located pump 13 to the engine fuel pump 15, and then, by way of the main fuel control 17 and conduit 19, to the nozzles within combustor 61 of turbojet engine 49. In addition to a conventional head maintenance bypass 20 for maintaining a relatively constant pressure differential across the fuel control valve 17, a fuel trim solenoid or bypass 21 is controllable to divert fuel from the engine by way of lines 22 and 33 back to the inlet of pump 15. A torque motor or electrical valve could be used instead of a solenoid. This second fuel bypass operates independently from the first bypass 20 under certain conditions to divert fuel exiting the fuel control 17 away from the engine and back to the fuel pump 15 to maintain an engine temperature below a threshold level. Bypass 21 is operable only during engine start-up, and is enabled upon engine light-off and disabled when the engine reaches normal idle speed.

The bypass 21 includes a solenoid operable valve 29, which may be either a ball type or balanced poppet type, and a check valve 23, and an orifice or flow restrictor 27, in series. Fuel trim solenoid valve assembly 21 is set or calibrated to flow 13.5–17.0 pph (Jet A Fuel) at 100 psid. Passing the diverted fuel flow through this flow limiting orifice 27 serves to limit the quantity of fuel diverted. Because of the small orifice, 75 micron screens 25 and 31 are also installed (on either side) to remove particulate matter and prevent debris blockage. The check valve 23 is at the outlet of the solenoid valve 29 so that when fuel pressure increases (due to heating) between the solenoid valve 29 and check valve 23 and the solenoid valve 29 is closed, the check valve 23 will open and allow the heated fuel to return to the pump 15.

The solenoid valve 29 of the fuel trim solenoid 21 is controlled by pulse width modulated signals from the electronic control unit or ECU 45 which may be of either a digital or analog architecture. This Control unit 45 receives input information from a torque meter oil pressure sensor or TMOP 41, the gas generator (shaft 55) speed N1 on electrical harness line 37, power turbine (shaft 63) speed N2 from speed sensor 39, rotor speed NR from speed sensor 43, T4.5 turbine outlet temperature by way of line 35, ambient pressure (PA) from sensor 48, ambient temperature (TA) from sensor 47, and airspeed from sensor 46.

Figure 3:
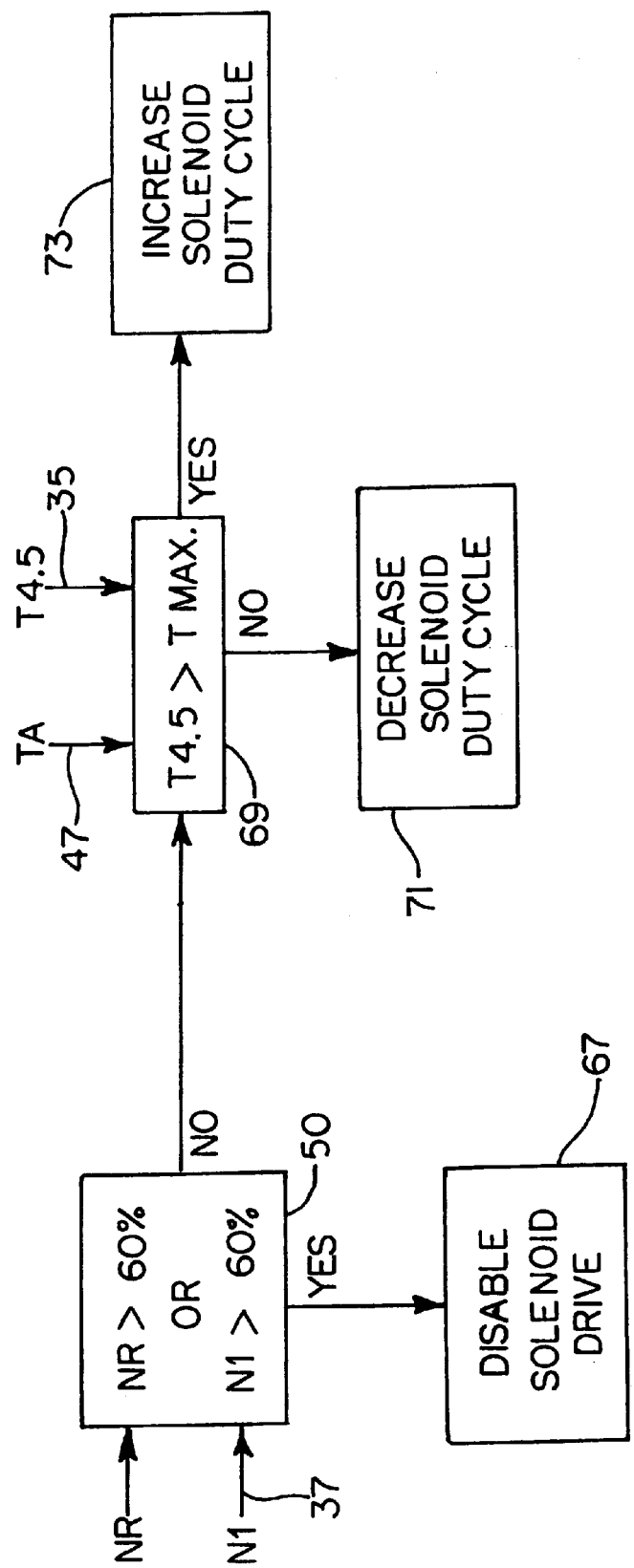
FIG. 3 is a simplified block diagram illustrating control of the solenoid valve of FIG. 2.

The system 10 reduces fuel flow to the engine nozzles (derichment) by pulse-width modulation (PWM) of the fuel trim solenoid 21. Control of the solenoid valve 29 is accomplished using the electronic control unit 45. The duty cycle of the solenoid valve 29 is dependent upon the sensed T4.5 temperature in relation to the temperature limit set in the ECU 45. The system derichment is locked out when the engine speed is above ground idle (60% of rated speed). The fuel derichment algorithms installed in the ECU are based primarily on gas generator shaft speed N1, exhaust gas temperature T4.5, and are biased by ambient or inlet air temperature TA. FIG. 3 illustrates a simple algorithm wherein if the gas generator speed N1 exceeds 60% of the full throttle speed NF (a "yes" from block 50), the solenoid 21 is disabled as indicated at 67. Disabling typically occurs 20 to 30 seconds after light off depending upon the engine model. The system may also monitor rotor speed and disable the solenoid 21 if the aircraft is airborne as indicated, for example, when NR exceeds 60% of rated rotor speed. Outlet temperature T4.5 is compared to some predetermined maximum value Tmax at 69 and, if that maximum is exceeded, the solenoid 21 duty cycle is increased, that is, the portion of each cycle during which the solenoid is enabled is increased, as shown at 73. Tmax is typically some maximum permissible increment above ambient temperature TA. Otherwise, that duty cycle is decreased as at 71. The T4.5 temperature limits set in the system are those specified in the applicable engine manual.

Figure 4:
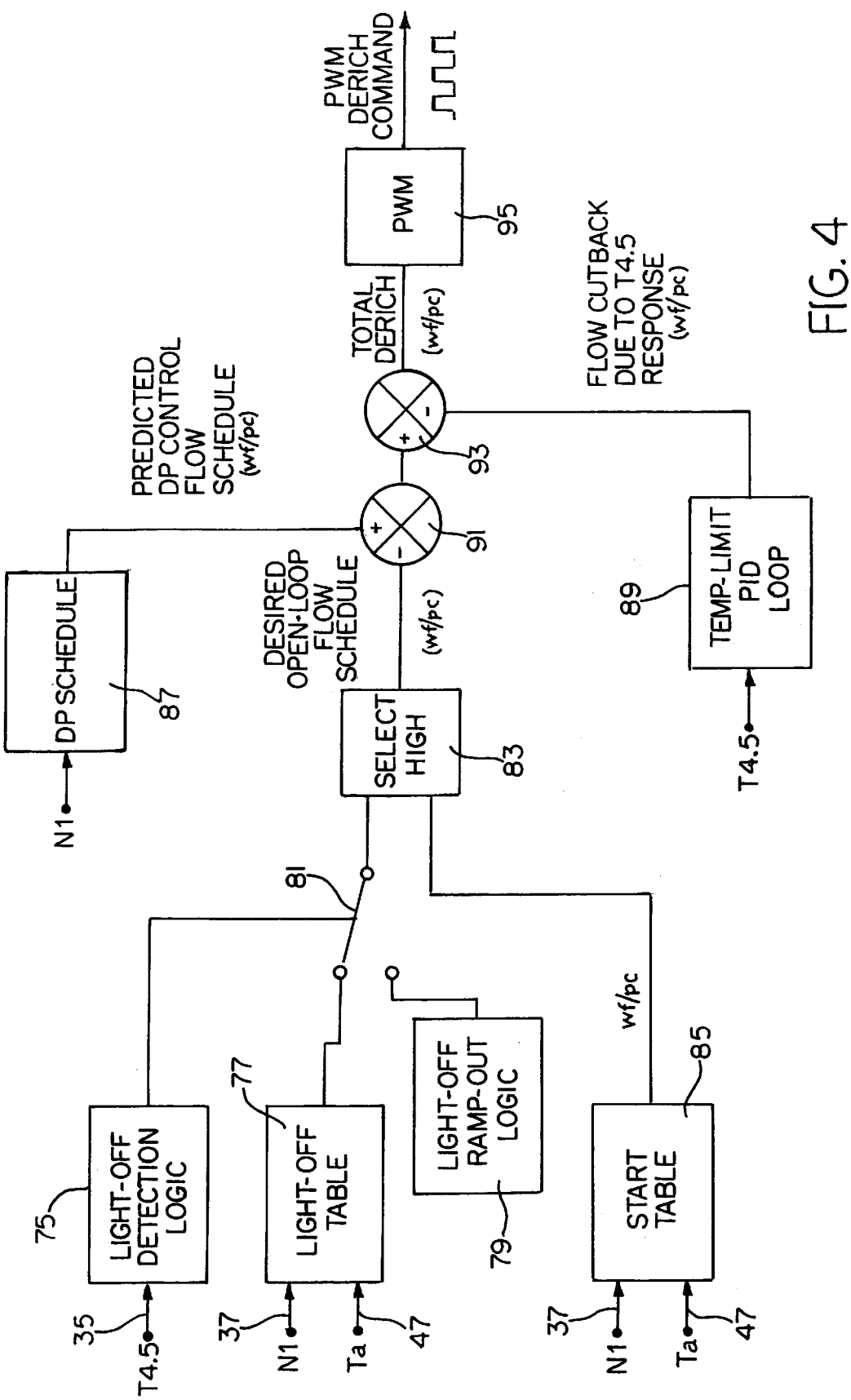
FIG. 4 is a block diagram of the temperature limiting portion of the electronic control of FIG. 1.
Figure 5:
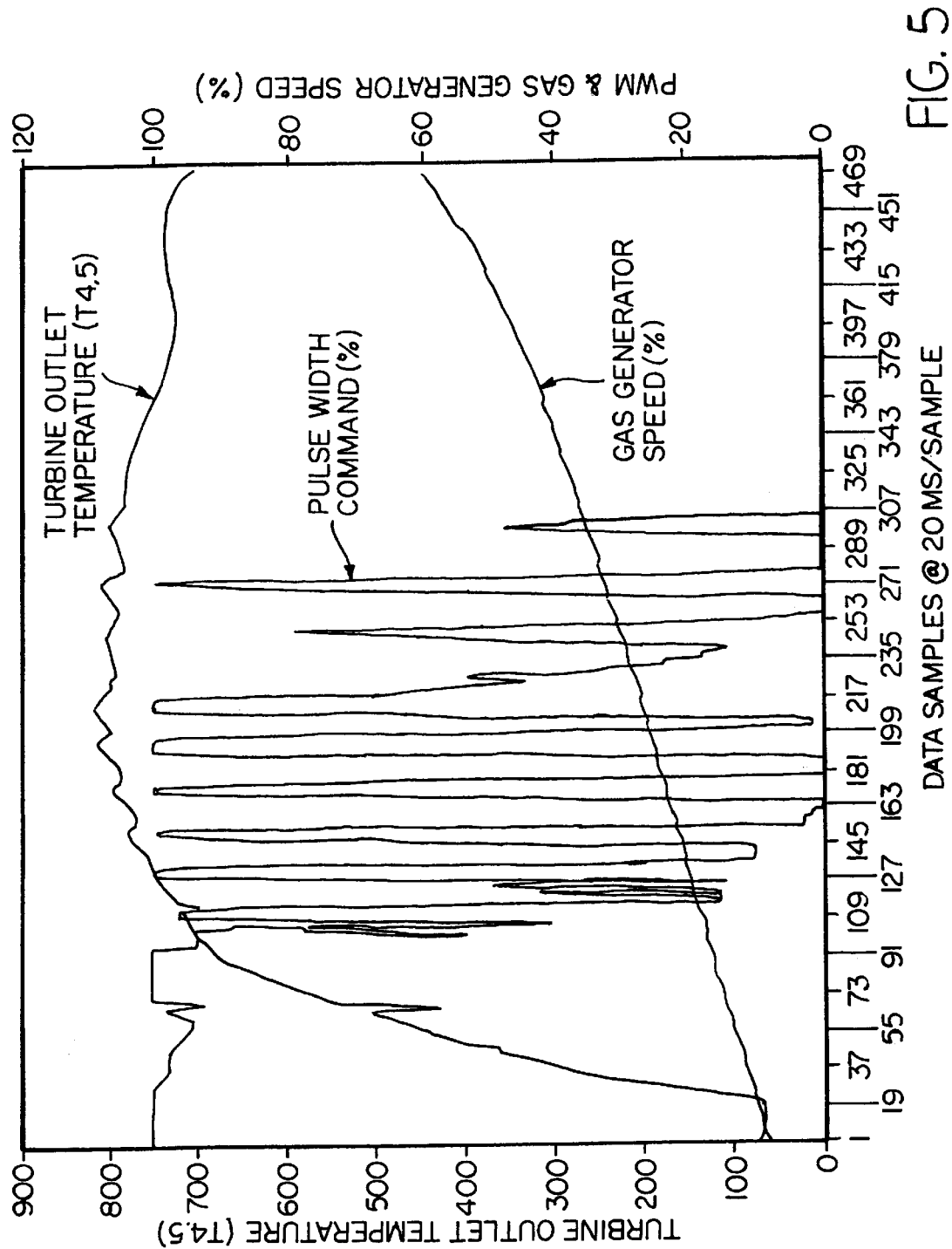
FIG. 5 graphically illustrates temperature control achieved by the system of FIGS. 1–4 during start up.

FIG. 4 illustrates the logic controlling the generation at 95 of the pulse width modulated signals controlling solenoid 21. Table 87 contains a predicted fuel flow schedule for the particular engine as a function of gas generator speed N1. The values which may be read from the light-off table 77 are functions of both the gas generator speed as indicated on line 37 and ambient temperature as indicated on line 47. The TA input provides the capacity for the fuel mixture to be enriched at lower temperatures. The light-off table 77 is utilized only if the detector logic 75 fails to detect a light-off indicative temperature on line 35. Otherwise, switch 81 couples the ramp-out logic 79 to one input of the select high circuit 83. A start Table 85 contains a fuel flow schedule as a function of both gas generator speed and ambient temperature and, during start-up, the higher of the two values which is indicative of the desired open-loop flow, is supplied from circuit 83 to the summer 91. The other summer input is from the schedule table 87. The output of summer 91 provides one input to the summer 93 while the other is provided by the temperature limiting PID loop 89 which provides a flow cutback signal indicative of the sensed temperature T4.5. The resultant deriching signal controls the pulse width modulation signals emanating from generator 95. FIG. 5 is illustrative of the operation of the circuit of FIG. 4.

In FIG. 5, the abscissa samples times begin at light off as detected at 75. At about sample number 100, circuit 89 indicates fuel cut back is called for and fuel trim solenoid 21 is enabled. The sensed temperature drops somewhat and at about sample number 107 the solenoid is shut off. Again the temperature rises. The monitoring and reduction of fuel is repeated so long as the monitored parameter (N1) remains below the predetermined 60% threshold. Energization of the solenoid approximately corresponds to the relative maxima of the temperature curve between sample number 100 and sample number 300. Thereafter, the control is quiescent until the gas generator speed reaches the 60% level at which time operation of the solenoid is discontinued.

Returning to FIG. 1, the other inputs read by the ECU are used for backup control should the primary inputs fail. Other features for the system include exceedence monitoring (all inputs) and potentially automated power checks. Inputs and outputs between the pilot and the system are indicated generally at 97 and include a fault lamp which acknowledges failure of the system, a circuit breaker which produces pilot override for catastrophic system failure, a pilot command switch input for pilot request for system status and power check. A serial data bus 99 is also provided for maintenance actions (data download) and set-up via a remote personal computer. This allows the recording of monitored temperature, gas generator speed and fuel flow diminution, and subsequently modifying the engine fuel system to provide enhanced engine performance achieving overtemperature avoidance with reduced fuel flow diminution.

What is claimed is:

1. An aircraft having an engine, an engine exhaust gas temperature sensor and an engine fuel supply system including a fuel pump and a fuel control for controlling the flow of fuel from the pump to the engine, the improvement comprising:

a controllable fuel flow bypass for diverting selectively fuel exiting the fuel control away from the engine and back to the fuel pump to thereby decrease the rate of fuel flow to the engine, the fuel flow bypass including a solenoid operable valve;

means responsive to sensed exhaust gas temperature for supplying a pulse width modulated control signal to the solenoid operable valve; and means for enabling the fuel flow bypass during engine start-up and for disabling the fuel flow bypass when the engine reaches normal idle speed.

2. The improvement of claim 1, wherein the fuel flow bypass includes a particulate matter filter and a flow limiting orifice connected in series with the solenoid operable valve between the fuel control and the fuel pump.

3. A fuel delivery system, comprising a fuel control having a fuel control valve for supplying metered fuel flow to an engine and means for a first fuel bypass, a fuel pump for supplying fuel from a fuel source to the fuel control, the first fuel bypass means controlling the diversion of fuel away from the fuel control and back to the fuel pump to maintain a relatively constant pressure differential across the fuel control valve, a second fuel bypass operable independently of the first fuel bypass means and for diverting fuel exiting the fuel control away from the engine and back to the fuel pump to maintain an engine temperature below a threshold level, and means for enabling the second bypass upon engine light-off.

4. The fuel delivery system of claim 3, wherein the second fuel bypass is operable only during engine start-up, and the enabling means further comprising means for disabling the second fuel bypass when the engine reaches normal idle speed.

5. The fuel delivery system of claim 3, wherein the second fuel bypass includes a particulate matter filter, a flow limiting orifice, a solenoid actuatable valve, and a check valve connected in series between the fuel control and the fuel pump.

6. The fuel delivery system of claim 3, wherein system includes an engine exhaust gas temperature sensor and the second fuel bypass includes a solenoid operable valve, and the system including means responsive to sensed exhaust gas temperature for supplying a pulse width modulated control signal to the solenoid operable valve.

7. An engine fuel system that controls fuel flow to an engine, wherein fuel normally flows from an engine fuel pump through a main fuel control to the engine and a portion of fuel flow is diverted by a first bypass back to the fuel pump to maintain a relatively constant pressure differential at the fuel control, the system comprising:

exhaust gas temperature and gas generator speed sensors; and control means for measuring ambient temperature and computing a threshold temperature as a prescribed temperature increment above the measured ambient temperature and recording the exhaust gas temperature, gas generator speed and fuel flow reduction; the improvement wherein the system provides engine over-temperature avoidance during the start-up of an engine and includes a second bypass that operates independently of the first bypass, and the control means including means for comparing gas generator speed and threshold temperature with exhaust gas temperature, the control means reducing fuel flow to the engine when the exhaust gas temperature exceeds the threshold temperature by diverting a portion of the fuel flow from the main fuel control back to the engine fuel pump by means of the second bypass which operates independently of the first bypass, and precluding fuel flow reduction to the engine despite the exhaust gas temperature exceeding the threshold temperature when the gas generator speed exceeds a predetermined idle speed.

8. The system of claim 7, wherein the system includes a flow limiting orifice to limit the quantity of fuel diverted by the second bypass.

9. The system of claim 7, wherein the control means resumes undiminished fuel flow when the exhaust gas temperature falls below the threshold temperature during engine start-up.

10. The system of claim 9, wherein the control means continues to monitor, reduce and preclude fuel flow after resuming undiminished fuel flow so long as the exhaust gas temperature remains below the threshold temperature during engine start-up.

11. The system of claim 7, wherein the second bypass reduces fuel flow to the engine by cyclically enabling and disabling for a period a return flow of a portion of the fuel flow from the main fuel control back to the engine fuel pump.

12. The system of claim 11, wherein the period of cyclic enabling and disabling is fixed and a fraction of each cycle during which enabling occurs is controlled in accordance with the exhaust gas temperature.

* * * * *